United States Patent [19]
Gaal, Jr. et al.

[11] Patent Number: 6,100,364
[45] Date of Patent: Aug. 8, 2000

[54] WATER-REDUCIBLE PHENOLIC BINDERS, METHODS OF PREPARATION AND COATING SYSTEMS

[75] Inventors: Robert J. Gaal, Jr.; Roger W. Heitland, both of St. Louis, Mo.

[73] Assignee: U.S. Polymers, Inc., St. Louis, Mo.

[21] Appl. No.: 09/304,702

[22] Filed: May 4, 1999

[51] Int. Cl.[7] .............................. C08G 14/04; C08G 8/10

[52] U.S. Cl. ..................... 528/129; 528/137; 528/142; 528/144; 528/158.5; 528/161; 524/248; 524/354; 524/729; 524/736

[58] Field of Search ............................ 528/129, 137, 528/142, 144, 158.5, 161; 524/248, 354, 729, 736; 428/425.3

[56] References Cited

U.S. PATENT DOCUMENTS

| | | | |
|---|---|---|---|
| 5,051,454 | 9/1991 | Lemon et al. | 523/146 |
| 5,525,670 | 6/1996 | Nishi et al. | 524/512 |
| 5,770,750 | 6/1998 | Hutchings et al. | 554/223 |

*Primary Examiner*—Duc Truong
*Attorney, Agent, or Firm*—Senniger, Powers, Leavitt & Roedel

[57] ABSTRACT

A water-reducible binder for coatings comprises the reaction products of a) a phenolic resin comprising the reaction product of bisphenol A, t-butyl phenol and formaldehyde; b) an alkylene carbonate alkoxylating agent; c) a diol selected form the group consisting of 1,4-cyclohexanedimethanol, 3,5,5-trimethylpentane diol and neopentyl glycol; and d) trimellitic anhydride. Methods for preparing such a water-reducible binder and coating systems comprising such a binder are also disclosed.

25 Claims, No Drawings

WATER-REDUCIBLE PHENOLIC BINDERS, METHODS OF PREPARATION AND COATING SYSTEMS

BACKGROUND OF THE INVENTION

This invention relates to water-reducible phenolic resin binders and, more particularly, to novel water-reducible phenolic resin binders exhibiting improved properties for use in coating systems and methods for preparing such binders.

Phenolic polymer resin binders for use in coating systems are known. U.S. Pat. No. 5,770,750, for example, discloses certain alkyd and aralkyd derivatives of phenolic polyol polymers and their use in coating systems. Such products may be constituted by an ester which is the reaction product of a fatty acid with an aliphatic hydroxyl moiety of an alkoxylated phenolic aralkylation polymer comprising the alkoxylation reaction product of (1) an alkoxylating agent such as an alkylene carbonate with (2) a phenolic aralkylation polymer comprising the reaction product of a phenolic monomer having at least two free reactive positions, a styrene derivative and a coupling agent such as formaldehyde. It is also known to react 1,4-cyclohexanedimethanol and trimellitic anhydride with polyester resins. Further, while trimellitic anhydride has been used in making water-reducible binders, it has been found that it tends to cause hydrolysis of resin ester groups and render the resins water-insoluble.

There is a continuing need to develop improved water-reducible phenolic resin binders which are stable in water, provide early water resistance, good chemical resistance and hardness and which are compatible with other materials and speed drying time when used in coating systems.

SUMMARY OF THE INVENTION

Among the several objects of the invention may be noted the provision of a novel water-reducible phenolic binder for coatings which comprises the reaction product of a phenolic resin, an alkylene carbonate alkoxylating agent, trimellitic anhydride and a diol such as 1,4-cyclohexanedimethanol; the provision of such a water-reducible phenolic binder which imparts improved properties when incorporated into coating systems; the provision of a novel phenolic resin binder of this type which is useful for blending with other water-reducible alkyd resins; and the provision of methods for preparing such water-reducible phenolic binders and of coating systems comprising such binders. Other objects and features will be in part apparent and in part pointed out hereinafter.

Briefly, the present invention is directed to a water-reducible binder for coatings which comprises the reaction product of (a) a phenolic resin comprising the reaction product of bisphenol A, t-butyl phenol and formaldehyde; (b) an alkylene carbonate alkoxylating agent; (c) a diol; and (d) trimellitic anhydride. The invention is also directed to the method for preparing a water-reducible binder for coatings which comprises the steps of (a) reacting a phenolic resin comprising the reaction product of bisphenol A, t-butyl phenol and formaldehyde with an alkylene carbonate at a temperature of approximately 380–410° F. for a time sufficient to cause evolution of carbon dioxide gas and capping of the phenolic hydroxyl moieties;

(b) adding to the product of step (a) a diol selected from the group consisting of 1,4-cyclohexanedimethanol, 3,5,5-trimethylpentane diol and neopentyl glycol at a temperature below approximately 400° F. and maintaining the resulting mixture for substantial removal of water at a temperature of approximately 360° F. and the attainment of an acid value of approximately 40–45 and a Gardner Holt viscosity of X-Z at 50% in xylene; and (c) reducing the resulting product to approximately 65% nonvolatiles in a water-soluble solvent.

The invention is further directed to coating systems comprising the water-reducible binders of the invention.

DESCRIPTION OF THE PREFERRED EMBODIMENTS

In accordance with the present invention, it has now been found that improved water-reducible binders for coatings may be provided by formulating the reaction product of (a) a phenolic resin comprising the reaction product of bisphenol A, t-butyl phenol and formaldehyde; (b) an alkylene carbonate alkoxylating agent; (c) a diol which may be 1,4-cyclohexanedimethanol, 3,5,5-trimethylpentane diol or neopentyl glycol; and (d) trimellitic anhydride. The water-reducible binders so formulated may be usefully combined with water-based, water-reduced or emulsified materials such as epoxy-ester emulsions, acrylic latex emulsions, water-reducible alkyd resins or may be cross-linked with isocyanates to form polyurethane formulations and provide coatings or films with increased hardness, mar resistance, initial gloss, early water resistance, fast drying and excellent corrosion resistance. The binders may also be cross-linked with aminoplast such as melamine for baking applications.

The phenolic resin component of the binders of the invention is the reaction product of bisphenol A, t-butyl phenol and formaldehyde. A phenolic resin of this type is commercially available under the trade designation "CK-2400" from Georgia-Pacific Resins, Inc. Another but less preferred phenolic resin of this type which may be used in the practice of the invention is commercially available under the trade designation "HRJ-11937" from Schenectady International, Inc.

In carrying out the invention, the phenolic resin is reacted with an alkylene carbonate alkoxylating agent at a temperature of approximately 380–410° F. for a time sufficient to cause evolution of carbon dioxide gas and capping of the phenolic hydroxyl moieties. As the alkoxylating agent, ethylene carbonate, propylene carbonate or butylene carbonate may be used with ethylene carbonate being the preferred alkoxylating agent. Upon reaction of the phenolic resin with an alkylene carbonate, a ferric chloride test is run to determine completion of the reaction. In this test, five grams of the resin produced by the reaction are removed and dissolved in acetone. Ten drops of a ferric chloride solution (0.6% by weight of ferric chloride in acetone) is added and if the solution is clear to slightly pink, the test is passed and the reaction is complete. If the endpoint is not initially achieved and the resin is flakable, additional alkylene carbonate is added to the reaction mixture, held for one hour and then resampled.

Once the alkylene carbonate endpoint is reached, trimellitic anhydride and a diol selected from the group consisting of 1,4-cyclohexanedimethanol, 3,5,5-trimethylpentane diol and neopentyl glycol are added to the reaction mixture at a temperature below approximately 400° F. and the resulting mixture is maintained for substantial removal of water at a temperature of approximately 360° F. and the attainment of an acid value of approximately 40–45 and a Gardner Holt viscosity of X-Z at 50% in xylene. While any of the above-noted diols may be used in the practice of the invention, the use of 1,4-cyclohexanedimethanol is preferred. The resulting product is then reduced to approximately 65% nonvolatives in a water-soluble solvent such as ethylene glycol monobutyl ether (Butyl Cellosolve) to yield the final water-reducible binder of the invention.

In another embodiment of the invention, a phenolic resin of the type described above is first reacted with a styrene derivative in the presence of an acid catalyst such as hydrochloric acid and then reacted with an alkylene carbonate alkoxylating agent as previously described. In this embodiment, the styrene derivative is substituted into the aromatic ring of the phenolic resin. The styrene derivatives which may be employed include styrene, vinyltoluene, divinylbenzene, alkyl styrenes such as methylstyrene and butylstyrene, mixed vinyltoluenes and mixed alkyl styrenes.

In another optional but preferred aspect of the invention, a phenolic resin of the type described above is first alkoxylated with an alkylene carbonate alkoxylating agent as previously described following which the hydroxyl moieties are then esterified with an aliphatic acid. The resulting product is then further reacted with trimellitic anhydride and a diol such as 1,4-cyclohexanedimethanol as previously described to provide a liquid water-reducible binder suitable for use in various coating systems. For this purpose, the aliphatic fatty acid employed may be saturated ($C_nH_{2n+1}COOH$) or unsaturated ($C_nH_{2n-1}COOH$) and any of the commercially available fatty acids may be used to esterify the hydroxyl moieties. Further, a blend of fatty acids such as tall oil fatty acids (TOFA) may be used for esterification. As known by those skilled in the art, TOFA contains as the four primary fatty acids palmitic acid (5%), stearic acid (2%), oleic acid (48%) and linoleic acid (45%). TOFA is the preferred source of fatty acids for use in the preferred invention. It will be understood that water-reducible binders of the invention which comprise reaction products not containing an aliphatic fatty acid are solid, flakable products whereas these containing TOFA or other aliphatic acid are liquid.

In the reaction between the phenolic resin and alkylene carbonate alkoxylating agent, an alkali hydroxide catalyst such as potassium hydroxide is employed to catalyze the capping of the phenolic hydroxyl moieties and a mild antioxidant such as triphenyl phosphite may also present to control the color of the reaction product. A water insoluble solvent such as xylene or other solvent having a specific gravity less than that of water is employed to aid in removing water during the esterification with an aliphatic fatty acid and the final esterfication with trimellitic anhydride and the aforementioned diol. In the final step of the method for preparing the water-reducible binders of the invention, ethylene glycol monobutyl ether (Butyl Cellosolve) or other water insoluble solvent is used as the final let down solvent to thin the final binder product to a desired viscosity.

In use, the water-reducible binders of the invention are preneutralized with a neutralizing agent to render the binders water soluble by neutralizing any free carboxylic acid groups. Then when a coating system containing the preneutralized binder is applied to a substrate, the carboxylic acid groups are reformed to render the cast film water-resistant rather than water-soluble. For this purpose, ammonium hydroxide or an amine such as monoethyl amine or triethyl amine may be employed.

As shown by the test results set forth hereinafter, the preneutralized water-reducible binders of the invention when incorporated into coating systems provide films or coatings with early water resistance, fast drying, good chemical resistance and improved stability.

The following examples illustrate the practice of the invention.

EXAMPLE 1

Propylene carbonate (875 kg.), a phenolic resin (identified by the trade designation CK-2400, Georgia-Pacific Resins, Inc. 1225 kg.), potassium hydroxide (3.5 kg.) and triphenyl phosphite (0.35 kg.) were loaded into a reactor. The mixture was heated in the reactor to a temperature of 400° F. and held for evolution of carbon dioxide gas and capping of the phenolic hydroxyl moieties. Within one hour of the noticeable evolution of carbon dioxide gas, the resin should be flakable and the propylene carbonate endpoint should be achieved. Once the propylene carbonate endpoint was reached, Tall oil fatty acids (TOFA) (175 kg.) were added and the mixture heated to 480° F. with azeotropic reflux for removal of water of reaction.

The reaction mixture was then held for an acid value of 2.5 maximum and a viscosity of W-Y on the Gardner Holt scale at 70% in xylene. Once this is achieved, a cut to 90% in xylene was made. 1,4-cyclohexanedimethanol (612.5 kg.) and trimellitic anhydride (612.5 kg.) were then added to the reaction mix at a temperature below 400° F. and the mix maintained for removal of water (approximately 100 kg.) at a temperature of 360° F. The reaction mix was then held for attainment of an acid value of approximately 40–45 and a Gardner Holt viscosity of X-Z at 50% in xylene. The resulting product is then reduced to approximately 65% nonvolatiles in Butyl Cellosolve (1496 kg.) The final water-reducible binder product has a viscosity of $Z_5-Z_7$, 65+2% nonvolatiles, a color of 10 max and an acid value of approximately 35–40.

EXAMPLE 2

The water-reducible binder prepared in Example 1 was used to prepare a clear water-reducible base by mixing 345 lb. of the binder with 12.5 lb. of ammonia until the latter dissolved and then slowly adding 447 lb. of water.

The clear base thus prepared was used to prepare various clear baking enamel coating formulations having the following compositions:

|  | Formulation | | | |
| --- | --- | --- | --- | --- |
| Component | A | B | C | D |
| Clear Base | — | 8.0 | 24.1 | 80.2 |
| Water-reducible alkyd resin (McWhorter) | 34.3 | 34.3 | 34.3 | 34.3 |
| Ammonia | 1.3 | 1.3 | 1.3 | 1.3 |

|  | Formulation | | | |
| --- | --- | --- | --- | --- |
| Component | A | B | C | D |
| Butyl Cellosolve | 1.5 | 1.5 | 1.5 | 1.5 |
| Water | 44.7 | 44.7 | 44.7 | 44.7 |
| Hexamethoxy-methylated melamine (Cytec) | 23.0 | 23.0 | 23.0 | 23.0 |
| Ratio of Clear Base to Alkyd Resin | 0/100 | 10/90 | 30/70 | 50/50 |

The above formulations were applied to cold rolled steel substrates and cured for 10 minutes at 300° F. Each of formulations A, B, C and D produced clear films on the substrates. The substrates thus prepared were subjected to various evaluations with the following results:

|  | Formulation | | | |
| --- | --- | --- | --- | --- |
| Evaluation | A | B | C | D |
| Pencil Hardness | B | HB | F | H |
| Dry Crosshatch (% Removed) | Pass (1%) | Pass (1%) | Pass (1%) | Fail (35%) |
| Impact | | | | |
| Direct | 60 | 60 | 60 | 10 |
| Indirect | 40 | 40 | 40 | <2 |
| Film Thickness | 1.0 mil. | 1.2 mil. | 1.2 mil. | 1.1 mil. |
| Gloss | | | | |
| 60° | 86 | 87 | 91 | 93 |
| 20° | 70 | 71 | 73 | 74 |
| Mar Resistance | Good | Very Good | Excellent | Best |

|  | Formulation | | | |
| --- | --- | --- | --- | --- |
| Evaluation | A | B | C | D |
| Water Spot Resistance | | | | |
| 70° F. | Pass | Pass | Pass | Pass |
| 120° F. | Pass | Pass | Pass | Pass |

EXAMPLE 3

The clear water reducible base prepared as described in Example 2 was used to prepare various clear air dry enamel coating formulations having the following compositions:

|  | Formulation | | | |
| --- | --- | --- | --- | --- |
| Component | A | B | C | D |
| Clear Base | — | 8.0 | 24.1 | 80.2 |
| Water-reducible alkyd resin (McWhorter) | 34.3 | 34.3 | 34.3 | 34.3 |
| Ammonia | 1.3 | 1.3 | 1.3 | 1.3 |
| Butyl Cellosolve | 1.5 | 1.5 | 1.5 | 1.5 |
| Water | 44.7 | 44.7 | 44.7 | 44.7 |
| Cobalt Drier (Metal soap, OMG) | 1.0 | 1.0 | 1.0 | 1.0 |
| Ratio of Clear Base to Alkyd Resin | 0/100 | 10/90 | 30/70 | 50/50 |

The above formulations were applied to cold rolled steel substrates and allowed to air dry for a cure time of 7 days at 80° F. Each of the formulations A, B, C and D produced clear films on the substrates. The substrates thus prepared were subjected to various evaluations with the following results:

|  | Formulation | | | |
| --- | --- | --- | --- | --- |
| Evaluation | A | B | C | D |
| Pencil Hardness | HB | F | H | H |
| Dry Crosshatch (% Removed) | Pass (1%) | Pass (1%) | Pass (1%) | Pass (1%) |
| Impact | | | | |
| Direct | 60 | 50 | 20 | <2 |
| Indirect | 20 | 10 | 8 | <2 |
| Film Thickness | 1.1 mil | 1.1 mil | 1.1 mil | 1.1 mil |
| Gloss 60° | 78 | 89 | 92 | 90 |
| Mar Resistance | Good | Very Good | Excellent | Best |
| Water Spot Resistance | | | | |
| 70° F. | Pass | Pass | Pass | Pass |
| 120° F. | Pass | Pass | Pass | Pass |
| QUV (300 hours) 60° (Gloss of Coating Exposed to Ultraviolet Light) | 59 | 92 | 91 | 59 |

Further evaluation was performed to determine the stability of each of the above-noted formulations. One-half pint of each formulation was exposed for 30 days at a temperature of 140° F. After exposure, the viscosity and pH of each material was compared to their initial values. The results are as follows:

|  | Formulation | | | |
| --- | --- | --- | --- | --- |
|  | A | B | C | D |
| Initial Values Viscosity (Krebs Units) | 100 | 110 | 120 | 125 |
| pH | 8.6 | 8.6 | 8.6 | 8.6 |
| Values (at 15 days) | | | | |
| Viscosity (Krebs Units) | 112 | 122 | 127 | 120 |
| pH | 7.2 | 7.3 | 7.1 | 7.0 |

|  | Formulation | | | |
| --- | --- | --- | --- | --- |
|  | A | B | C | D |
| Values (at 30 days) | | | | |
| Viscosity (Krebs Units) | 125 | 122 | 112 | 104 |
| pH | 6.9 | 6.9 | 6.8 | 6.7 |

EXAMPLE 4

A phenolic resin (identified by the trade designation CK-2400, Georgia-Pacific Resins, Inc., 1140 kg.), a styrene monomer (60 kg.) and hydrochloric acid (0.05 kg.) were loaded into a reactor, heated to 350° F. and held at that temperature for 4 hours while observing for an exothermic reaction. Propylene carbonate (896 kg.) and potassium hydroxide (45% aqueous, 7.60 kg.) were added and the reaction mix heated to 400° F. and held for evolution of carbon dioxide gas and capping of the phenolic hydroxy moieties. The resulting product is visually inspected for flakability to determine completion of the propylene carbonate reaction. Once the propylene carbonate endpoint was achieved, Tall oil fatty acids (TOFA) (251 kg.) were added and the mixture heated to 480° F. with azeotropic reflux for removal of water of reaction.

The reaction mixture was then held for an acid value of 2.5 maximum and a viscosity of W-Y on the Gardner Holt scale at 70% in xylene. Once this is achieved, a cut to 90% in xylene was made. 1,4-cyclohexanedimethanol (594.20 kg.) and trimellitic anhydride (599.60 kg.) were then added to the reaction mixture at a temperature below 400° F. and the mixture was held for the removal of approximately 56.1 kg. of water at 360° F. The reaction mixture was then held for attainment of an acid value of approximately 40–45 and a Gardner Holt viscosity of X-Z at 50% in xylene. The resulting product was then reduced to approximately 65% nonvolatiles in Butyl Cellosolve.

The final water reducible binder product has a viscosity of $Z_5$–$Z_7$, 65+2% nonvolatiles, a color of 10 max and an acid value of approximately 35–45.

In view of the above, it will be seen that the several objects of the invention are achieved and other advantageous results attained.

As various changes could be made in the above products and processes, without departing from the scope of the invention, it is intended that all matter contained in the above description shall be interpreted as illustrative and not in a limiting sense.

What is claimed is:

1. A water-reducible binder for coatings comprising the reaction product of
    a) a phenolic resin comprising the reaction product of bisphenol A, t-butyl phenol and formaldehyde;
    b) an alkylene carbonate alkoxylating agent;
    c) a diol selected from the group consisting of 1,4-cyclohexanedimethanol, 3,5,5-trimethylpentane diol and neopentyl glycol; and
    d) trimellitic anhydride.

2. A water-reducible binder for coatings as set forth in claim 1 wherein said diol is 1,4-cyclohexanedimethanol.

3. A water-reducible binder for coatings as set forth in claim 1 wherein said alkylene carbonate is propylene carbonate.

4. A water-reducible binder for coatings as set forth in claim 1 said binder reaction product further comprises an aliphatic fatty acid.

5. A water-reducible binder for coatings as set forth in claim 1 wherein said phenolic resin reaction product further comprises a styrene derivative.

6. A water-reducible binder for coatings as set forth in claim 4 wherein said aliphatic fatty acid is constituted by tall oil fatty acids (TOFA).

7. A water-reducible binder for coatings as set forth in claim 5 wherein said styrene derivative is styrene.

8. A water-reducible binder for coatings comprising the reaction product of
    a) a phenolic resin comprising the reaction product of bisphenol A, t-butyl phenol and formaldehyde;
    b) propylene carbonate;
    c) 1,4-cyclohexanedimethanol; and
    d) trimellitic anhydride.

9. A water-reducible binder for coatings as set forth in claim 8 wherein said binder reaction product further comprises tall oil fatty acids (TOFA).

10. A water-reducible binder for coatings as set forth in claim 8 wherein said phenolic resin reaction product further comprises styrene.

11. A water-soluble binder for coatings comprising the binder of claim 1 preneutralized with a neutralizing agent selected from the group consisting of ammonium hydroxide and an amine.

12. A water-soluble binder for coatings comprising the binder of claim 8 preneutralized with ammonium hydroxide.

13. A water-soluble binder for coatings comprising the binder of claim 9 preneutralized with ammonium hydroxide.

14. A method for preparing a water-reducible binder for coatings comprising the steps of:
    a). reacting a phenolic resin comprising the reaction product of bisphenol A, t-butyl phenol and formaldehyde with an alkylene carbonate at a temperature of approximately 380–410° F. for a time sufficient to cause evolution of carbon dioxide gas and capping of the phenolic hydroxyl moieties;
    b) adding to the product of step a) a diol selected from the group consisting of 1,4-cyclohexanedimethanol, 3,5,5-trimethylpentane diol and neopentyl glycol and trimellitic anhydride at a temperature below approximately 400° F. and maintaining the resulting mixture for substantial removal of water at a temperature of approximately 360° F. and the attainment of an acid value of approximately 40–45 and a Gardner Holt viscosity of X-Z at 50% in xylene; and
    c) reducing the resulting product to approximately 65% nonvolatile in a water-soluble solvent.

15. A method as set forth in claim 14 wherein said alkylene carbonate is propylene carbonate.

16. A method as set forth in claim 14 wherein said diol is 1,4-cyclohexanedimethanol.

17. A method as set forth in claim 14 wherein said phenolic resin reaction product further comprises a styrene derivative.

18. A method as set forth in claim 17 wherein said styrene derivative is styrene.

19. A method as set forth in claim 14 wherein after step a) and prior to step b) an aliphatic fatty acid is added to the product of step a) and the resulting mixture is heated to approximately 480° F. with azeotropic reflux for removal of water of reaction.

20. A method as set forth in claim 19 wherein said aliphatic fatty acid is constituted by tall oil fatty acids (TOFA).

21. A coating system comprising the water-reducible binder of claim 1.

22. A coating system comprising the water-reducible binder of claim 8.

23. A coating system comprising the water-reducible binder of claim 9.

24. A coating system comprising the water-reducible binder of claim 11.

25. A coating system comprising the water-reducible binder of claim 12.

* * * * *